Nov. 4, 1947.　　　　　J. W. BARRY　　　　　2,430,205
PUBLIC SPEAKING CRITICISM BOARD
Filed Dec. 30, 1944　　　3 Sheets—Sheet 1
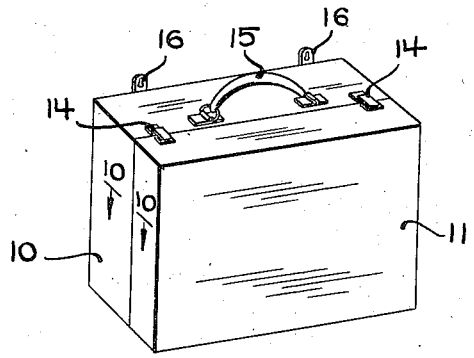
Fig. 1.
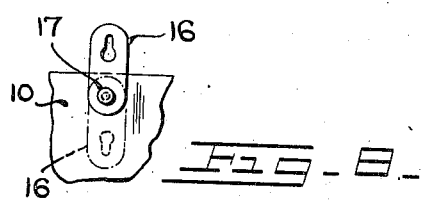
Fig. 8.
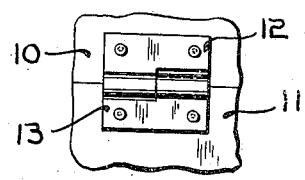
Fig. 9.
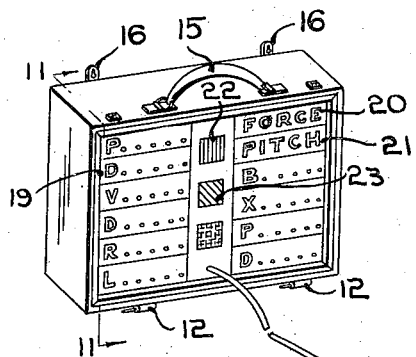
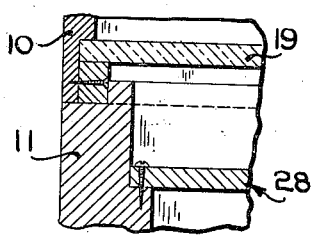
Fig. 10.
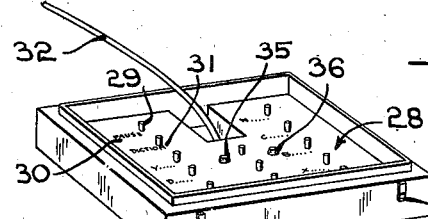
Fig. 7.
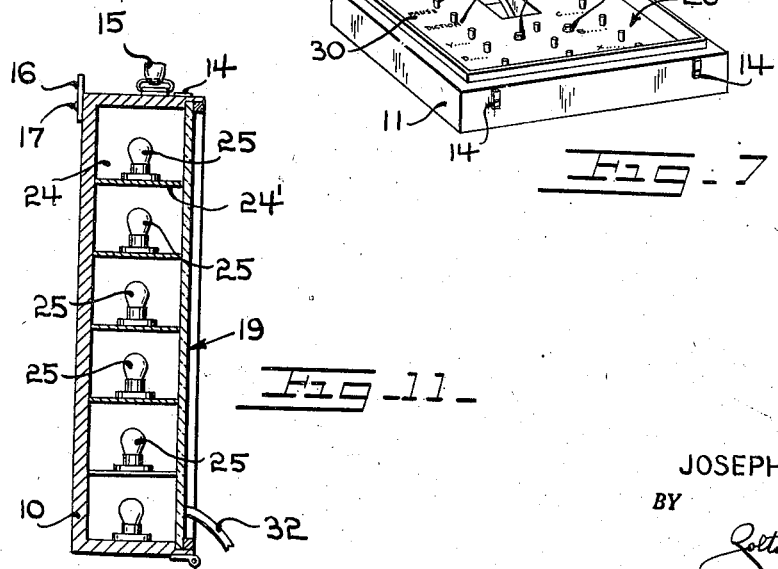
Fig. 11.
INVENTOR.
JOSEPH W. BARRY
BY
ATTORNEY.

Nov. 4, 1947.  J. W. BARRY  2,430,205
PUBLIC SPEAKING CRITICISM BOARD
Filed Dec. 30, 1944  3 Sheets-Sheet 2
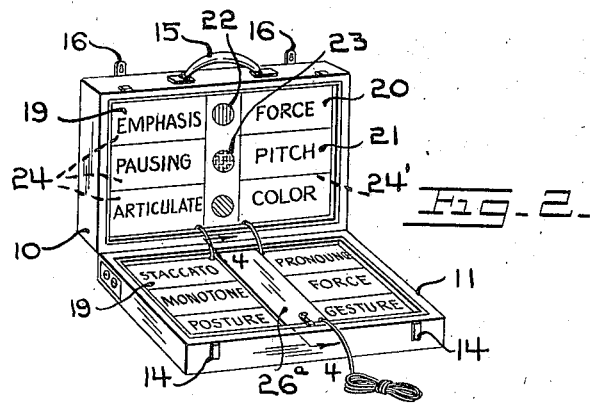
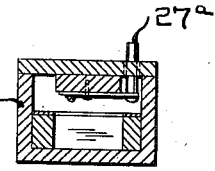
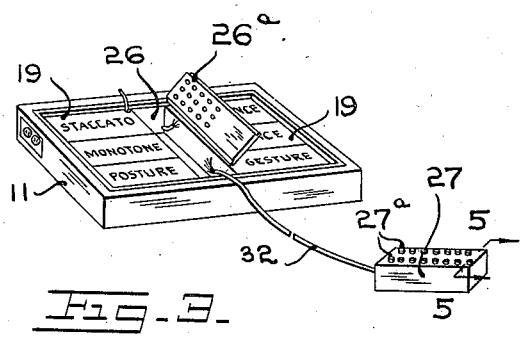
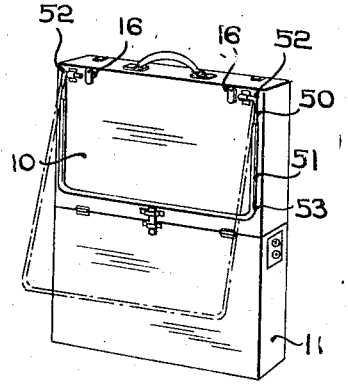
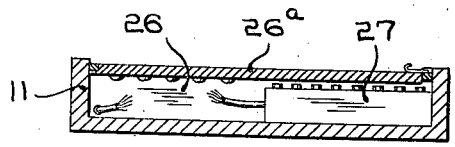
INVENTOR.
JOSEPH W. BARRY
BY
ATTORNEY.

Nov. 4, 1947.  J. W. BARRY  2,430,205
PUBLIC SPEAKING CRITICISM BOARD
Filed Dec. 30, 1944  3 Sheets-Sheet 3

INVENTOR.
JOSEPH W. BARRY
BY
ATTORNEY.

Patented Nov. 4, 1947

2,430,205

UNITED STATES PATENT OFFICE 2,430,205

PUBLIC SPEAKING CRITICISM BOARD

Joseph W. Barry, Ogdensburg, N. Y.

Application December 30, 1944, Serial No. 570,649

1 Claim. (Cl. 35—1)

This invention relates to new and useful improvements in a public speaking criticism board. More particularly, the invention proposes a criticism board which may be viewed by a student speaking before a class, and may be viewed by the class, and may be operated by the instructor to criticize the student as he speaks.

It is proposed to characterize the criticism board by the fact that it is provided with a plurality of criticism legends which may be illuminated by the instructor to display one legend from the group and thus criticize a speaker. For example, the legends may read "Force," "Pitch," "Color," and there may be symbols to indicate certain criticisms such as a red light for faster, a green light for satisfactory, and another colored light for slow.

The invention furthermore contemplates the provision of a control board provided with identical criticism legends, a push button switch for each legend, and a control system by which the instructor by operating the control board may control the criticism board.

The invention still further proposes to so construct the criticism board that it is in the nature of a portable carrying box. With this arrangement it may be set up and used in the classroom and stored away when desired.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 1 is a perspective view of a public speaking criticism board constructed in accordance with this invention, but illustrated in its closed position.

Fig. 2 is a perspective view of the public speaking chart opened.

Fig. 3 is a fragmentary perspective view of a portion of the device, ready for operation.

Fig. 4 is a vertical sectional view taken on the line 4—4 of Fig. 2.

Fig. 5 is an enlarged vertical sectional view taken on line 5—5 of Fig. 3.

Fig. 6 is a perspective rear view of the device in opened condition.

Fig. 7 is perspective view of a modified for of the public speaking chart in open condition, ready for operation.

Fig. 8 is a fragmentary back view of a portion of Fig. 7.

Fig. 9 is a fragmentary bottom view of a portion of Fig. 1.

Fig. 10 is a fragmentary horizontal sectional view taken on the line 10—10 of Fig. 1.

Fig. 11 is a fragmentary enlarged vertical sectional view taken on the line 11—11 of Fig. 7.

Figure 12:
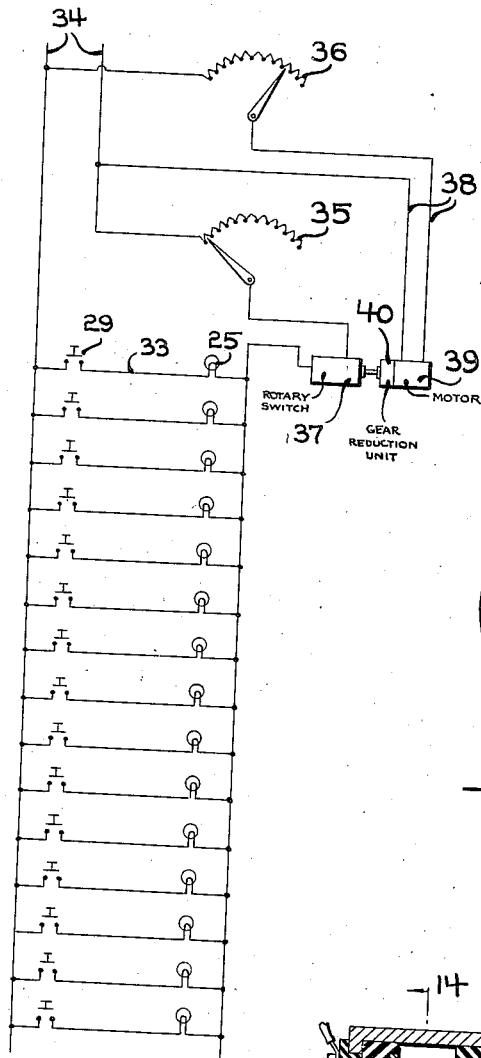
Fig. 12 is a schematic wiring diagram of the device.
Figure 14:
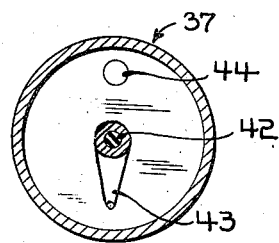
Fig. 14 is a sectional view taken on the line 14—14 of Fig. 13.
Figure 13:
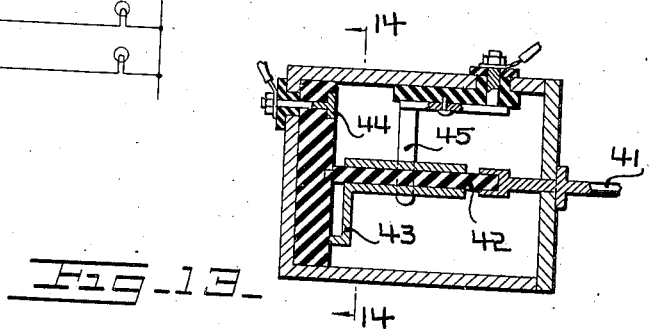
Fig. 13 is a sectional view of the rotary switch shown in Fig. 12.

The public speaking criticism chart, in accordance with this invention, includes a box-like container 10 having a front cover 11. Normally, the container 10 and cover 11 are hingedly connected by hinged leaves 12 and 13. These hinged leaves are respectively mounted on the container 10 and cover 11 by which these parts are hingedly connected. However, these hinged leaves are separable so that the cover 11 may be easily removed from the container 10. Latches 14 are used for normally latching the cover 11 closed on the container 10. The container 10 is provided with a top handle 15 by which it may be conveniently carried. It is also provided with support elements 16 by which it may be suspended from nails on a wall. These support elements 16 are pivotally supported by pintles 17 so that they may be swung downwards into inoperative positions, as indicated by dot and dash lines 18 in Fig. 8.

The box-like container 10 is provided with a front panel 19 having a plurality of criticism legends 20, 21, 22, 23, etc. The criticism legends 22 and 23 are in the nature of colored panels which will be illuminated. The criticism legends 20, 21, etc. are in the nature of panels containing words such as "Force," "Pitch," etc., which also will be illuminated. The interior of the container 10 is provided with a plurality of compartments 24 which are separated from each other by partitions 24'. Electric lamps 25 are mounted within said compartments. These electric lamps 25 are capable of illuminating their criticism legends. It is proposed that the criticism legends be painted upon the back sides of dark panels so that the legends cannot be read unless the lamps behind them are illuminated.

In the modified form of the invention shown in Fig. 7, the cover 11 is provided with a control panel 28 having a plurality of control switches 29. These switches 29 are arranged adjacent criticism legends 30, 31, etc., which correspond identically to the criticism legends upon the front panel of the container 10. A long cable 32 connects the control panel 28 with the various electric lamps 25. The lamps 25 are connected in individual circuits 33 each of which includes one of the switches 29. The circuits 33 are connected in parallel with each other and with the control circuit 34.

The control panel 28 is also provided with two rheostats 35 and 36. The rheostat 35 is connected in the circuit 34 so as to control the circuit 34. A rotary switch 37 is connected with the rheostat 35. The rheostat 36 is connected in a circuit 38 which includes an electric motor 39 connected with a gear reduction unit 40 which in turn is connected to drive the rotary switch 37.

The rotary switch 37 is provided with a shaft 41 which connects with a rod 42 of insulation material. This rod 42 connects a contact finger 43 of which during rotation of said rod engages a contact 44. A brush 45 engages the shank portion of said finger 43. The contact 44 and brush 45 are connected in series with the rheostat 35.

The operation of the public speaking criticism chart may be understood from the following:

The cover 11 is provided with a compartment 26 covered by a panel 26ª. A switch box 27 with control switches 27ª may be placed in the compartment 26 when the device is not in use, and removed therefrom to a convenient location when the device is in operation.

When the device is not used it is closed, as illustrated in Fig. 1. In this condition it may be carried through the street like a traveling case, or it may be stored away in the classroom. When it is desired to use the criticism chart, the cover 11 is removed from the container 10. The container 10 is then set up on a desk, or suspended from suitable nails, or other supports on a wall. The student speaker may watch the chart, or the instructor may have the student speaker's back to the chart so that only the class may see the chart. The instructor controls the illumination of the various criticism legends upon the panel 10 by operating the control board 28. The instructor may thus communicate to the class, points of criticism without interrupting the speaker. The speaker may also see the criticism and attempt correction.

The instructor is also capable of more forcibly signalling the speaker by controlling the rheostats 35 and 36. By using the rheostat 35, the instructor may increase or decrease the intensity of illumination of the various lamps 25 and so increase the intensity of the criticism legends. By controlling the rheostat 36 the instructor may increase or decrease the speed of the electric motor 39 which will correspondingly increase or decrease the speed of the rotary switch 37. In this way the instructor may control the speed of flickering of the lamps 25. The instructor may speed up the flickering action of the lamps to indicate an increase of speed and may even lead the student to the proper speed, or may slow down the rate of speaking when this is necessary.

A hinged easel bracket 50 is provided. This bracket consists of a telescopic U-shaped yoke 51 and the hinged arms 52. When the device is not in use, the telescopic bracket 50 is placed in a groove 53. The device may be supported by swinging the bracket 50 out of the groove 53 and then by extending the same to the desired length.

It is to be understood that this public criticism board or chart is used without interrupting the speaker. The size and proportion of the device, the reading matter and symbols of the criticism legends may be changed as desired. It may be made of wood, plastics or any other material and be connected to the usual house current or to dry cell batteries.

The device may also be used as an instruction communicator.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A public speaking criticism chart comprising a box-like container having a front panel with criticism legends thereon covering separate compartments within said container, electric lamps within said compartments for lighting said legends, a control board provided with identical criticism legends and a switch for each of its legends for controlling the lamp of the corresponding legend on said panel, a motor driven rotary switch for rapidly making and breaking the circuits to said lamps for flickering said lamps, a rheostat for controlling the speed of said motor, an electric circuit including said rheostat and motor in series, a rheostat for controlling the voltage through said rotary switch, and an electric circuit including said second named rheostat and rotary switch in series and said lamps and switches in parallel for controlling the intensity of illumination of said lamps, connected by an electric cable with said container whereby said lamps can be operated to illuminate particular legends, and flickered at varying speeds and illuminated with varying intensity for indicating degrees of emphasis.

JOSEPH W. BARRY.

REFERENCES CITED

The following references are of record in the file of this patent:

UNITED STATES PATENTS

| Number | Name | Date |
|---|---|---|
| 1,479,979 | Boughton | Jan. 8, 1924 |
| 1,401,608 | Kingsley | Dec. 27, 1921 |
| 1,481,132 | Greenewalt | Jan. 15, 1924 |
| 2,325,764 | Gall | Aug. 3, 1943 |
| 2,042,738 | Sharpnock | June 2, 1936 |
| 1,648,410 | Lawton | Nov. 8, 1927 |
| 1,194,517 | Lawton | Aug. 15, 1916 |
| 1,514,823 | Austin | Nov. 11, 1924 |
| 2,085,881 | Van Doren | July 6, 1937 |
| 1,683,827 | Ingram | Sept. 11, 1928 |